United States Patent
Lelievre et al.

(10) Patent No.: US 8,196,209 B2
(45) Date of Patent: Jun. 5, 2012

(54) CONTENT DISTRIBUTION CONTROL ON A PER CLUSTER OF DEVICES BASIS

(75) Inventors: Sylvain Lelievre, Montgermont (FR); Alain Durand, Rennes (FR); Oliver Courtay, Rennes (FR); Jean-Louis Diascorn, Betton (FR)

(73) Assignee: Thomson Licensing, Issy les Moulineaux (FR)

( * ) Notice: Subject to any disclaimer, the term of this patent is extended or adjusted under 35 U.S.C. 154(b) by 1149 days.

(21) Appl. No.: 11/883,989

(22) PCT Filed: Jan. 27, 2006

(86) PCT No.: PCT/EP2006/050491
§ 371 (c)(1),
(2), (4) Date: Aug. 8, 2007

(87) PCT Pub. No.: WO2006/084796
PCT Pub. Date: Aug. 17, 2006

(65) Prior Publication Data
US 2008/0114915 A1  May 15, 2008

(30) Foreign Application Priority Data

Feb. 11, 2005 (EP) ..................... 05101036

(51) Int. Cl.
*G06F 7/04* (2006.01)
(52) U.S. Cl. ......... 726/26; 726/2; 726/3; 726/8; 726/27; 726/31
(58) Field of Classification Search .................... 726/26, 726/2, 3, 8, 27, 31
See application file for complete search history.

(56) References Cited

U.S. PATENT DOCUMENTS

| | | | |
|---|---|---|---|
| 5,497,504 A * | 3/1996 | Acampora et al. | 455/436 |
| 5,671,217 A * | 9/1997 | Adams et al. | 370/233 |
| 5,978,385 A * | 11/1999 | Haddock et al. | 370/446 |
| 6,047,332 A * | 4/2000 | Viswanathan et al. | 709/245 |
| 6,088,737 A * | 7/2000 | Yano et al. | 709/235 |
| 6,192,483 B1 * | 2/2001 | Moiin et al. | 714/4 |
| 6,748,429 B1 * | 6/2004 | Talluri et al. | 709/221 |
| 6,922,564 B2 * | 7/2005 | Witana | 455/452.2 |

(Continued)

OTHER PUBLICATIONS

"IBM Response to DVB-CPT Call for Proposals for Content Protection & Copy Management: XCP Cluster Protocol" Internet Citation, Oct. 19, 2001, pp. 1-32.

(Continued)

*Primary Examiner* — Mohammad Reza
(74) *Attorney, Agent, or Firm* — Robert D. Shedd; Jeffrey M. Navon (57) ABSTRACT

A method for controlling access to content by an Acquisition Point to Presentation Points in clusters in a domain. The AP receives from a PP an access content request comprising the PPs cluster identity and the PP's priority. The AP verifies if access is granted to a PP in the cluster and, if so, grants access to the requesting PP. If not, the AP verifies if access is granted to PPs in a maximum number of clusters. If not, the AP grants access. If the maximum is reached, the AP verifies if the requesting PP's priority is higher than the priority of every PP in another cluster. If not, access is denied; if so, the AP grants access to the requesting PP and denies access to the PPs in the cluster with the lowest priority values. An Acquisition Point is also claimed.

20 Claims, 5 Drawing Sheets

U.S. PATENT DOCUMENTS

| | | | |
|---|---|---|---|
| 7,085,577 B1 * | 8/2006 | Katsuno et al. | 455/456.3 |
| 7,272,649 B1 * | 9/2007 | Shively et al. | 709/225 |
| 7,580,420 B2 * | 8/2009 | Schweidler et al. | 370/402 |
| 7,647,385 B2 * | 1/2010 | Encarnacion et al. | 709/217 |
| 7,675,882 B2 * | 3/2010 | Mighani et al. | 370/328 |
| 7,680,931 B2 * | 3/2010 | Nagami et al. | 709/225 |
| 2002/0055980 A1 * | 5/2002 | Goddard | 709/217 |
| 2002/0065915 A1 * | 5/2002 | Anderson et al. | 709/225 |
| 2003/0031129 A1 * | 2/2003 | Dutkiewicz | 370/230 |
| 2003/0182264 A1 * | 9/2003 | Wilding et al. | 707/1 |
| 2003/0187998 A1 * | 10/2003 | Petit | 709/229 |
| 2004/0103303 A1 | 5/2004 | Yamauchi et al. | |
| 2004/0151179 A1 | 8/2004 | Andre et al. | |
| 2004/0162870 A1 * | 8/2004 | Matsuzaki et al. | 709/200 |
| 2004/0242235 A1 * | 12/2004 | Witana | 455/452.2 |
| 2006/0036615 A1 * | 2/2006 | Masselle et al. | 707/100 |

OTHER PUBLICATIONS

Thomson Multimedia: "SmartRight Contribution to Rights Management & Protection Specifications" Internet Citation, May 22, 2002, pp. 1-29.

Search Report Dated Mar. 10, 2006.

* cited by examiner

CONTENT DISTRIBUTION CONTROL ON A PER CLUSTER OF DEVICES BASIS

This application claims the benefit, under 35 U.S.C. §365 of International Application PCT/EP2006/050491, filed Jan. 27, 2006, which was published in accordance with PCT Article 21(2) on Aug. 17, 2006 in English and which claims the benefit of European patent application No. 05101036.1, filed on Feb. 11, 2005.

The present invention relates generally to controlled distribution of content, particularly in media networks.

Content owners such as movie studios and broadcasters are very concerned with the illegal distribution of their content; content protection is very important. In general, only subscribers should be allowed to access the content. Several protection schemes exist, such as for example SmartRight, extensible Content Protection (xCP), and TiVoGuard Digital Output Protection Technology. These schemes use the notion of domains, commonly defined as encompassing all the devices that belong to a single household.

Figure 1:
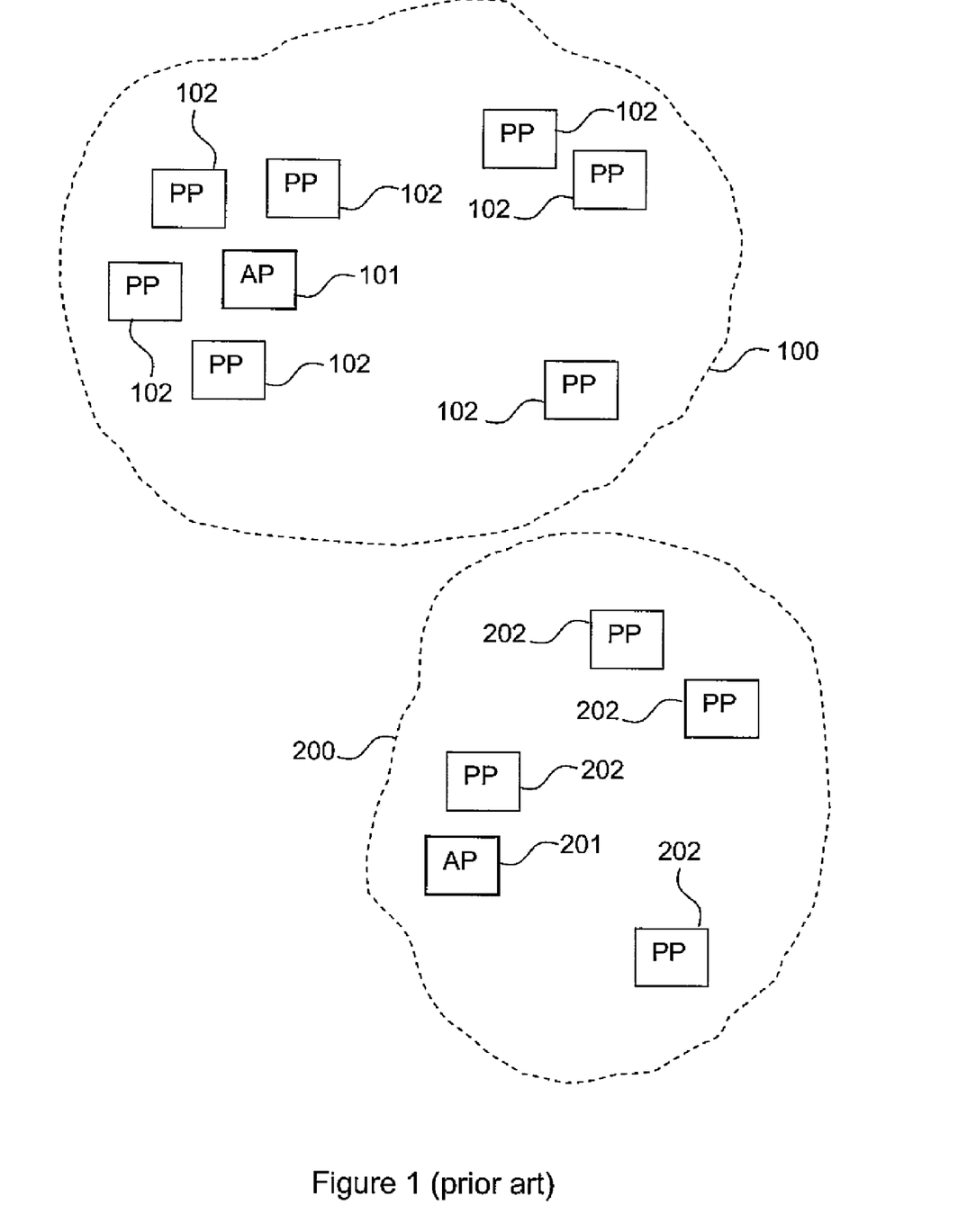
FIG. 1, already described, illustrates the notion of domains according to the prior art.

FIG. 1 illustrates as an example two domains 100, 200. Content acquired at an Acquisition Point (AP) 101, 201 can be distributed to all the devices (exemplified by Presentation Points, PP) 102, 202 belonging to the domain 100, 200, but not to devices outside the domain 100, 200. In other words, devices 202 in the second domain 200 can only access content distributed by the Acquisition Point 201 in the second domain 200, but cannot access content distributed by the Acquisition Point 101 in the first domain 100. A domain is not limited to a single geographical location and may for example comprise mobile devices as well as devices in a summer house. It should also be noted that the Presentation Points are not necessarily of the same kind.

Some domain protection schemes restrict content distribution to devices "close" to the Acquisition Point; devices that are too far away cannot access the content. This is known as "proximity control". The main rationale is to prevent a user from sharing a domain with e.g. relatives that are not part of the household. While proximity control prevents this, in some cases this is too restrictive: an honest family may for example be unable to access content from their summer home when the Acquisition Point is located in the primary home.

Figure 2:
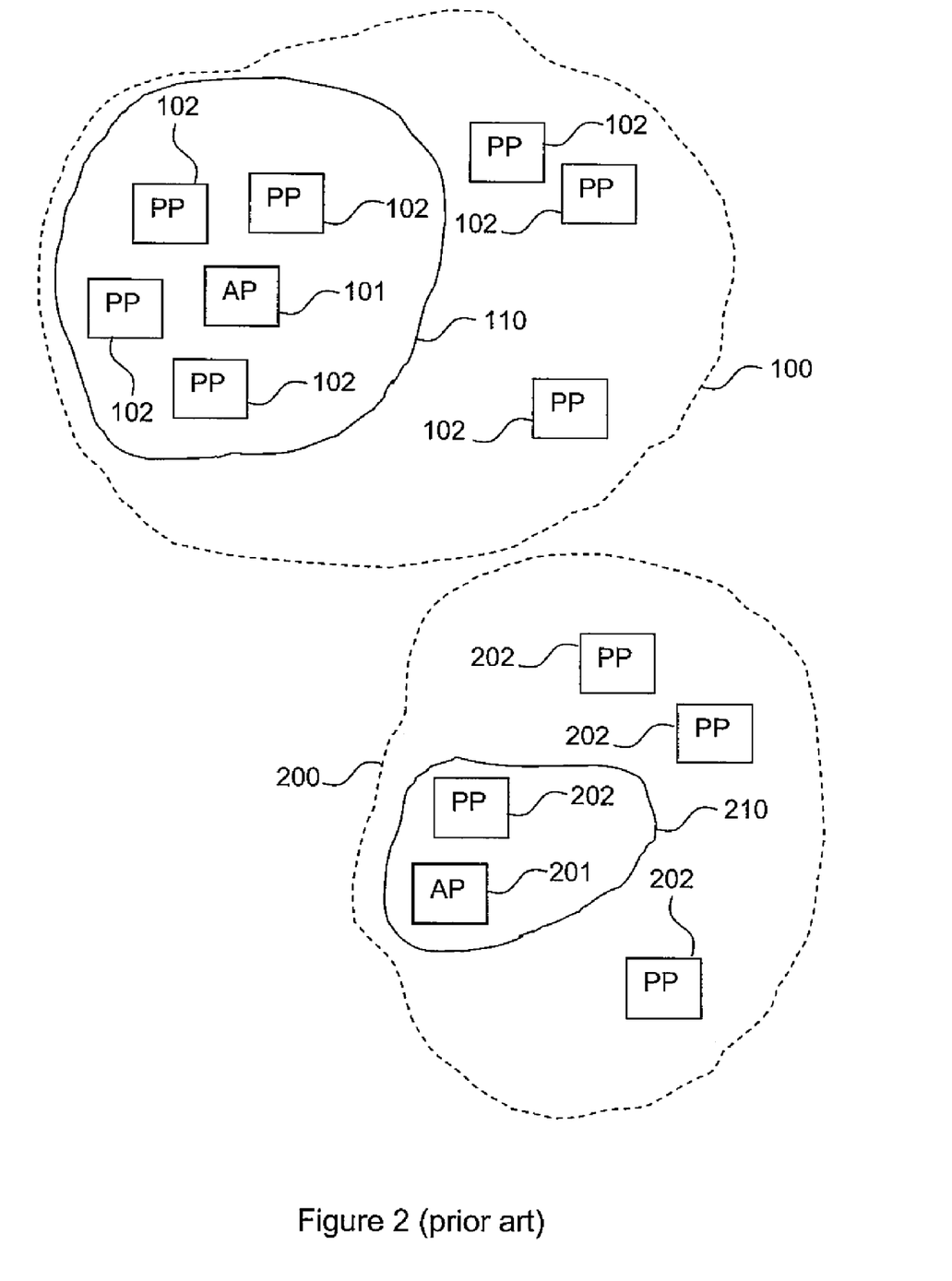
FIG. 2, already described, illustrates the notion of proximity control in domains according to the prior art.

FIG. 2 illustrates proximity control, with the same domains and the devices as in FIG. 1. In the first domain 100, only devices 102 in the area 110 "close" to the Acquisition Point 101 can access content distributed by it. Similarly, in the second domain 200, only devices 202 in the area 210 "close" to the Acquisition Point 201 can access content distributed by it. Usually, the content provider defines "close" and "far".

TiVo's solution overcomes this problem, but the price to pay is that the user's identity must be known. This allows the content provider to verify that users belong to the same family and, once verified, to relax the proximity restriction. Unfortunately, identifying users poses a problem in itself and causes anonymity and/or privacy issues. Furthermore, two friends who subscribe to different content may each buy a device and lend it to the other, thus enabling both friends to access all the content that they jointly subscribe to.

An application known as broadcast flag enables identification of content where Internet redistribution is restricted. Recently, the Federal Communication Commission (FCC) approved several copy protection systems for securing content marked with the broadcast flag. Domain copy protection systems were accepted even if they did not implement proximity control but some movie studios still require a protection system to implement proximity control.

It can therefore be appreciated that there is a need for a flexible solution that enables controlled distribution of access to distant users of a domain while preserving user anonymity and privacy. This invention provides such a solution.

In a first aspect, the invention is directed to a method for controlling distribution of content in a domain that comprises a first device (AP) that is adapted to distribute content and grant access to the content for at least one second device (PP). Each PP belongs to a cluster in the domain. The AP receives a request to access content from a PP. If the AP has not granted access to content to a further PP belonging to the same cluster as the requesting PP, it verifies the number of clusters to which it has granted access to content and grants access to the content to the requesting PP only if the number of clusters is lower than a predetermined maximum value.

In a preferred embodiment, the maximum value is variable. The maximum value may for example depend on the content or on the time.

In a further preferred embodiment, each PP has a priority value and, when the maximum value has been reached, access is granted to a requesting PP in a cluster in which access is denied if the priority value of the requesting PP is higher than the priority values of all the PPs in a cluster in which access is granted.

It is preferred that access will be denied to the PPs in the cluster with the lowest priority values at their next request to access content.

In yet a further preferred embodiment, each cluster has a cluster ID known to all the PPs therein, and the AP stores the cluster IDs and verifies the number of clusters to which it has granted content by counting the number of stored cluster IDs.

In yet another preferred embodiment, if the maximum number of clusters has been reached and if the AP is not already waiting for responses to a challenge/response protocol from the PPs, it initiates such a protocol with all PPs that have been granted access. The AP then counts the number of different cluster IDs it receives in response and grants access to the requesting PPs if the maximum value of clusters is not exceeded.

In yet a further preferred embodiment, the AP always grants access to a PP in its own cluster. This cluster is not counted against the maximum value of clusters.

In yet a further preferred embodiment, the AP grants access to the content to the requesting PP if it has granted access to content to a further PP belonging to the same cluster as the requesting PP.

In a second aspect, the invention is directed to a device (AP) for controlling distribution of content in a domain that further comprises at least one second device (PP). The AP is adapted to distribute content and grant access to the content for at least one of the PPs. Each PP belongs to a cluster. The AP is adapted to receive a request to access content from a PP. If the AP has not granted access to content to a further PP belonging to the same cluster as the requesting PP, it verifies the number of clusters to which the it has granted access to content, and grants access to the content to the requesting PP only if the number of clusters is lower than a predetermined maximum value.

In a preferred embodiment, the maximum value is variable. The maximum value may for example depend on the content or on the time.

In another preferred embodiment, the AP is further adapted to, when the maximum value has been reached, grant access to a requesting PP in a cluster in which access is denied if a priority value of the requesting PP is higher than the priority values of all the PP in a cluster in which access is granted.

It is preferred that the AP denies access to the PPs in the cluster with the lowest priority values at their next request to access content.

In a further preferred embodiment, the AP stores cluster IDs of clusters to which it has granted content, the cluster ID being known to each PP in a cluster, and verifies the number of such clusters by counting the number of stored cluster IDs.

In yet another preferred embodiment, if the maximum number of clusters has been reached and the AP is not already waiting for responses to a challenge/response protocol from the PPs, it initiates such a protocol with all PPs that have been granted access, counts the number of different cluster IDs it receives in response and grants access to the requesting PPs if the maximum value of clusters is not exceeded.

In yet a further preferred embodiment, the AP is further adapted to always grant access to PPs in its own cluster and to not count this cluster against the maximum value of clusters.

In yet a further preferred embodiment, the AP is further adapted to grant access to the content to the requesting PP if it has granted access to content to a further PP belonging to the same cluster as the requesting PP.

Preferred features of the present invention will now be described, by way of example, with reference to the accompanying drawings, in which:

FIG. 4, comprising

PREFERRED EMBODIMENT OF THE INVENTION

The present invention is based on a content distribution system with domain management. As already described, a domain (also called Personal Private Network, PPN) includes all devices of a user that can exchange content, regardless of geographical location, and content dedicated to one particular domain cannot be rendered in another domain.

The present invention improves the prior art solution by adding partitioning of the domain into clusters. A cluster is defined as a group of co-located devices belonging to the same copy protection domain. A cluster may evolve dynamically as devices enter or leave the cluster. While the definition of co-located depends on the implemented system, an example is given hereinafter.

Figure 3:
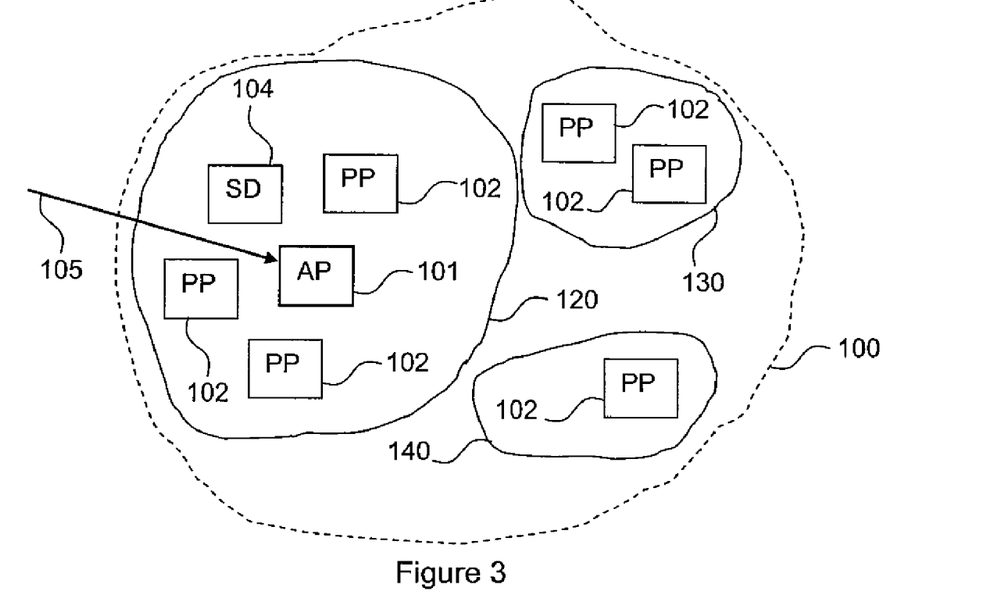
FIG. 3 illustrates the concept of clusters according to the invention.

FIG. 3 illustrates the concept of clusters according to the invention. FIG. 3 shows the first domain 100 that comprises the same devices as in the previous figures. A number of clusters 120,130, 140 each comprises a number of devices. The first cluster 120 comprises an Acquisition Point 101 and a number of Presentation Points 102. An Acquisition Point 101 receives content 105 and converts it to make it available within the domain 100. The Presentation Points 102 are, subject to restrictions provided by the invention, able to render the content distributed by the Acquisition Point 101, provided that they belong to the same domain. The first domain 100 also comprises a storage device 104, such as a recorder or a hard disk, that is adapted to store content that may be requested by a Presentation Point 102 later. It should be noted that content while content enters the domain through the Acquisition Point, it may also be redistributed by a Presentation Point or a Storage Device. It should also be noted that a domain may comprise more than one Acquisition Point.

The domain 100 comprises two further clusters 130, 140; the second cluster 130 comprising two Presentation Points 102, the third cluster comprising a single Presentation Point 102.

Distribution of content is controlled by limiting it to a limited number of clusters. The Acquisition Point 101, which accesses and distributes content, controls the distribution by counting the number of clusters that request the content. If the number is greater than a predefined maximum value, the Acquisition Point 101 limits distribution to the maximum authorized clusters.

In an alternative embodiment, the Acquisition Point 101 may always distribute content within the cluster to which it belongs. This cluster is not counted against the maximum number of clusters. A maximum number of clusters of zero then means that the Acquisition Point 101 cannot distribute content outside its own cluster, while a maximum number of clusters of, say, one, means that content can be distributed within the Acquisition Point's own cluster and another cluster.

Figure 4A:
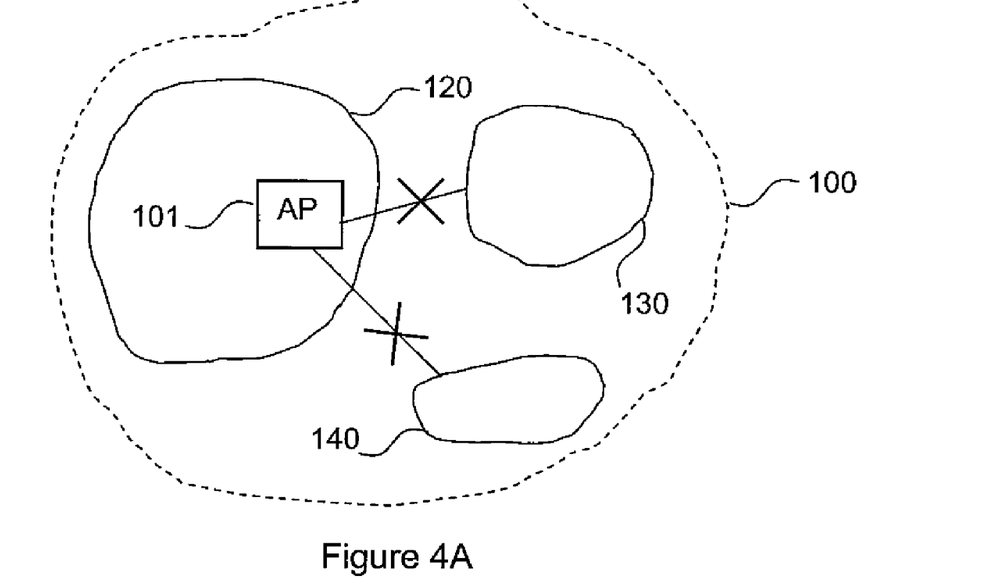
FIGS. 4A and 4B, illustrates limited distribution of content to a number of clusters according to the invention.
Figure 4B:
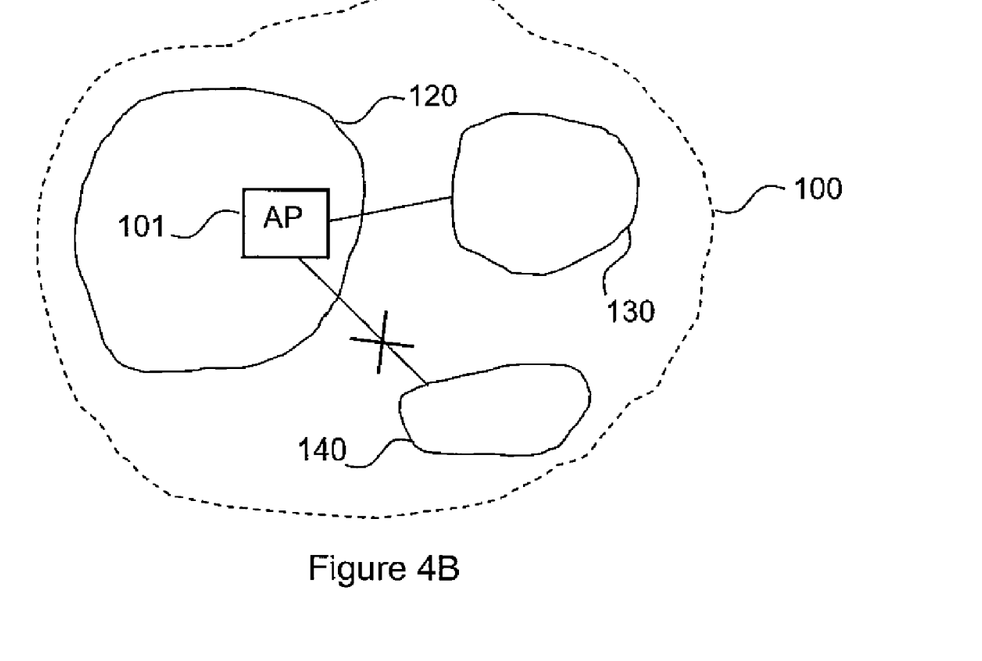

FIGS. 4A and 4B (together referred to as FIG. 4) illustrate limited distribution of content to a number of clusters according to the invention. In FIG. 4A, distribution is limited to one cluster. Supposing that a Presentation Point (not shown) in the first cluster requested the content first, then Presentation Points (not shown) in other clusters cannot access the content, as indicated by the crosses on the interconnecting lines. According to the invention, there is preferably no limit to the number of Presentation Points that may access the content within a cluster in which access is granted.

FIG. 4B illustrates distribution of content to two clusters. Supposing that Presentation Points (not shown) in the first cluster 120 and the second cluster 130 have requested the content, then the Acquisition Point 101 rejects requests from Presentation Points (not shown) in the third cluster 140 (as indicated by the cross on the interconnecting line). Further requests from Presentation Points in the first and second clusters 120, 130, in which the Acquisition Point already distributes content, are granted, however.

The invention authorizes content re-distribution within the cluster, i.e. a first Presentation Point is allowed to forward content to a second Presentation Point within the same cluster.

It should be noted that content distribution is limited to controlled content only; it is possible for a content provider to provide free content that is available for everyone. Furthermore, different content may have different restrictions, i.e. one content may for example be restricted to distribution within one cluster, another content restricted to two clusters, while a third content may be distributed to an unlimited number of clusters. In a preferred embodiment, the maximum value is set to the lowest value of the contents being accessed simultaneously. It is also possible for the maximum value to be time-dependent, such as for example depending on the current hour.

It is also possible for Presentation Points to have different priorities. Assuming for example that distribution is limited to two clusters, that Presentation Points in the first and the second clusters 120,130 access the content, and that a Presentation Point in the third cluster 140 has a higher priority than all the Presentation Points that access the content in the second cluster 130, then a request from this high-priority Presentation Point will be granted by the Acquisition Point 101, which then will deny access to the Presentation Points in the second cluster 130.

The priority of each device may for example be set by the user (e.g. through a special menu on the Presentation Point), but it may also be indicated in the certificate associated with the device. In a preferred embodiment, the priority value is inserted in the Terminal Challenge, which will be described hereinafter.

A preferred embodiment for the creation and maintenance (such as naming) of the clusters uses a solution offered by an extension of SmartRight.

As mentioned hereinbefore, devices (comprising Acquisition Points and Presentation Points) may belong to the same cluster if they are sufficiently "close" to each other. For example, the proximity control for SmartRight over IP may be used to determine "closeness": two devices are considered "close" if they are on the same LAN and if a packet with a Time To Live (TTL) of 7 ms can reach the other device.

Only powered, and preferably active, devices belong to a cluster. Whenever a device powers up, and/or preferably activates, it broadcasts a message that comprises a random value. The value is used as the cluster ID and is stored by all the devices in the cluster. The random value is ephemeral and renewed at each power-on or device insertion (i.e. when a device is activated). The length of the cluster ID should be designed so that it is unlikely that two clusters would pick the same ID; 128 bits is usually sufficient, but the length may be modified by the person skilled in the art.

A protocol is used to control access to content by the clusters. The preferred embodiment is based on a special feature of the view only mode in SmartRight. The Acquisition Point that distributes the content counts the number of Terminal Challenge messages it receives from Presentation Points that render the content. A Presentation Point sends a Terminal Challenge message when:

it explicitly requests access to the content; when it starts reading it, and when requested by the Acquisition Point, e.g. by setting a flag in the LECM (new_auth flag) to indicate to the Presentation Point that it needs to be re-authorized for security reasons. The latter case may be seen as a requested request to access the content.

The preferred embodiment modifies this feature by adding the cluster ID in the SmartRight Terminal Challenge message. This enables the Acquisition Point to count the number of clusters in which at least one Presentation Point is rendering a given content.

As already mentioned, the acquisition point denies access to the content when the maximum cluster limit has been reached. However, problems occur in the case of activation of a device in an already authorized cluster—which means that the cluster ID changes. The next challenge received (a new device in the cluster requests the content, or a PP accessing the content zaps to another content and zaps back to the original content) by the AP from this cluster will be abnormally denied if the maximum cluster limit has been reached. To remedy this, the Acquisition Point initiates a challenge/response session with the Presentation Devices (setting the new_auth flag) to re-count the number of clusters in which content is accessed. Since the number of clusters has not changed, just a cluster ID, the Acquisition Point grants access to the requesting Presentation Points.

During a predefined time after initiation of a challenge/response session (for a normal count or any re-count), the AP counts the challenge message and denies access when the limit is reached. When this time has passed, a new request can provoke a re-count.

To know if a cluster ID is new, an Acquisition Point stores in a secure location the IDs of the clusters to which it is currently delivering content. In a preferred embodiment, the cluster IDs are stored in the Acquisition Point security unit, which may be embodied in a smart card or other kind of portable unit. There is a limited storage need: an Acquisition Point serving a maximum of 10 clusters needs storage space for 10 cluster IDs. With a 128 bit cluster, this means a maximum of 1280 bits, which is quite acceptable for current smart cards.

The invention is applicable also in the case of chaining, which in this context means that a Presentation Point in one cluster redistributes the content to another cluster. According to the invention, a Presentation Point that desires to access content through another Presentation Point has to request access from the Acquisition Point originally providing the content. The content messages and the authorization messages may take different routes through the domain, making the invention independent from chaining.

Figure 5:
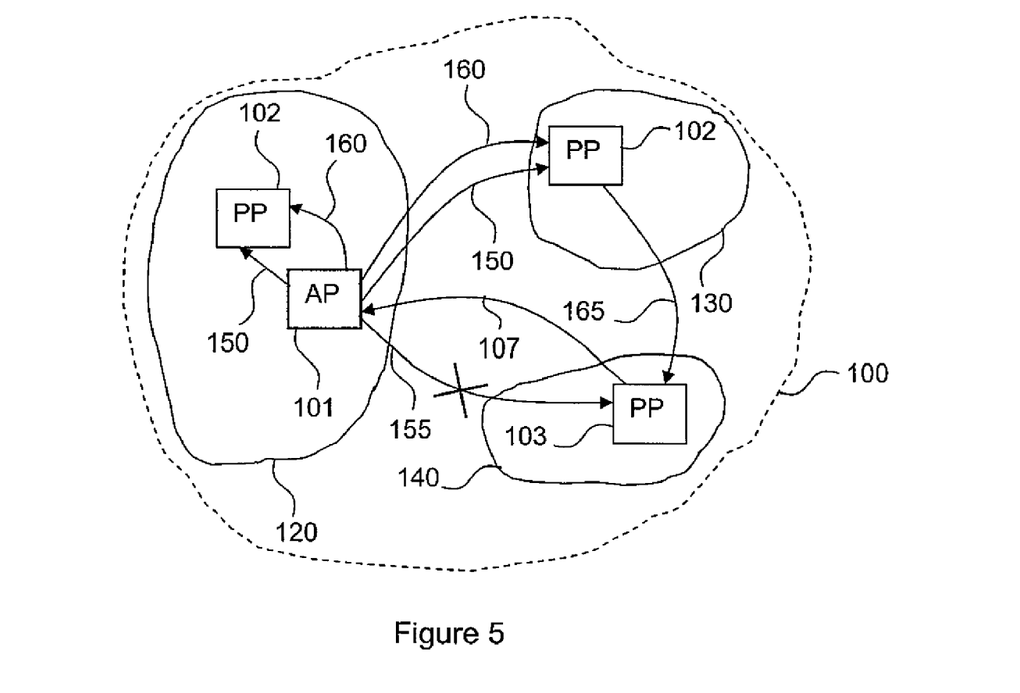
FIG. 5 illustrates limited distribution of content in the case of chaining of content according to the invention.

FIG. 5 describes chaining of content according to the invention. Suppose that content distribution is limited to two clusters. An Acquisition Point 101 in the first cluster 120, distributes content within the first cluster 120 and to at least one Presentation Point 102 in the second cluster 130. A Presentation Point 102 in the second cluster 130 is adapted to redistribute the content to a Presentation Point 103 in the third cluster 140. However, the Presentation Point 103 in the third cluster 140 needs to request access to the content from the Acquisition Point 101 in the first cluster 120 in an Access Request Message 107. Since the maximum cluster limit has been reached, the Presentation Point 103 in the third cluster 140 is denied access to the content. As can be seen in the Figure, the Acquisition Point 101 allows access to the Presentation Points 102 in the first cluster 120 and in the second cluster 130, as indicated by arrows 150. The content distributed by the Acquisition Point 101 is indicated by further arrows 160. When it comes to the Presentation Point 103 in the third cluster 140, the Acquisition Point 101 denies access (indicated by the cross on the arrow 155) and Presentation Point may not render the access redistributed by the Presentation Point 102 in the second cluster 130 (indicated by arrow 165).

A Presentation Point that wishes to access content on a Storage Device needs to request this from the Acquisition Point that originally delivered the content. If the Presentation Point and the Storage Device are in different clusters, this amounts to chaining, as described hereinbefore. When the Presentation Point and the Storage Device are in the same cluster, the "normal" (non-chaining) procedure is followed, as described hereinbefore.

It should be noted that the order of content distribution is not important, while the order of authorizations is. Since only one distant cluster is allowed to render the content, a member of the second cluster to request access will be denied.

Figure 6:
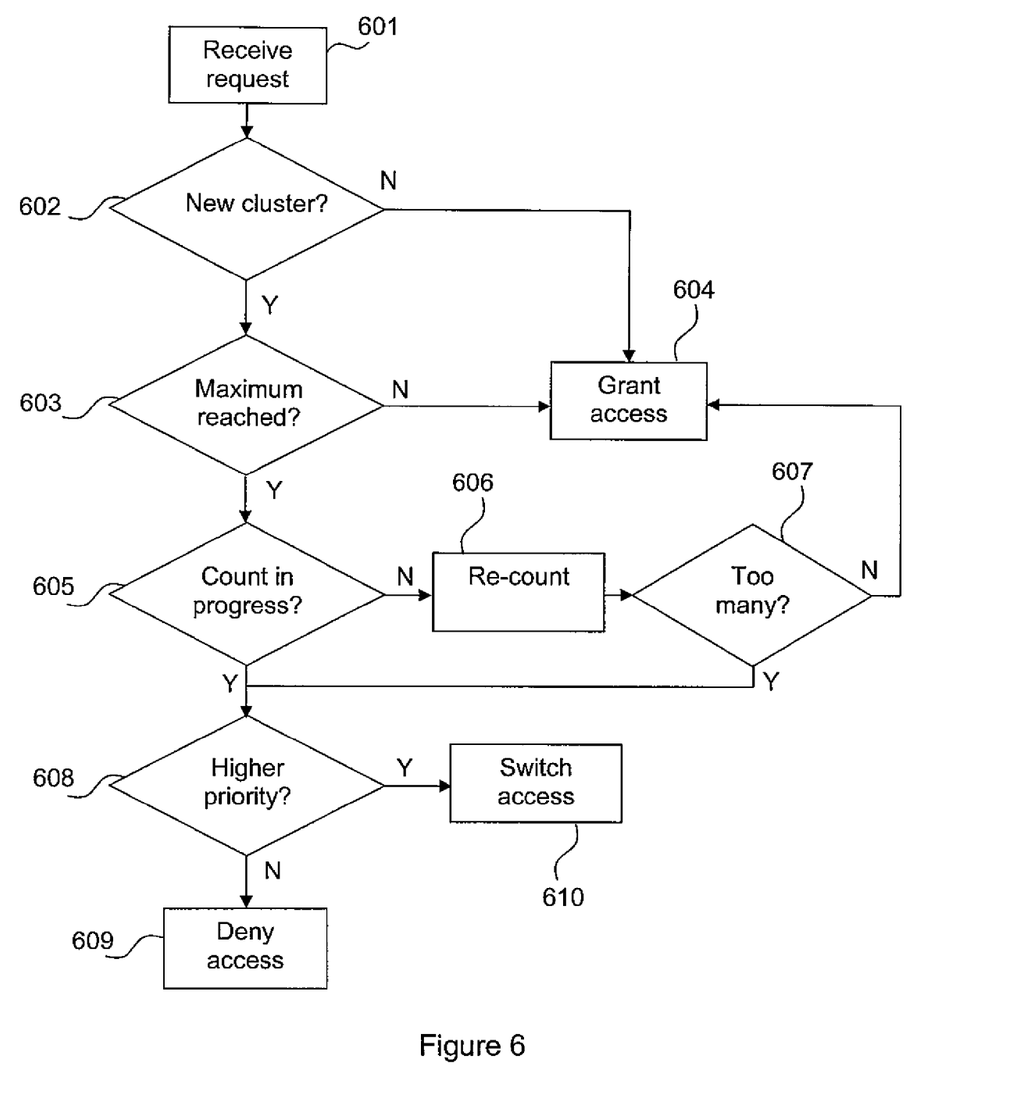
FIG. 6 illustrates a flowchart for a method of limited granting of access to content according to the invention.

FIG. 6 illustrates a flowchart for a method of limited granting of access to content according to the invention. In step 601, an Acquisition Point (AP) receives a request to access content from a Presentation Point (PP). The request comprises the identification value (ID) of the cluster to which the PP belongs.

In step 602, the AP verifies if it has already granted access to a PP in the cluster or if the cluster is new. If the AP has granted access to a PP in the same cluster (i.e. the cluster is not new), then it grants access to the PP in step 604. However, if the cluster is new, the method continues in step 603. In the embodiment where the AP always can distribute content within its own cluster, step 602 is preferably preceded by the step (not shown) of verifying if the requesting PP is in its own cluster. If so, access is granted in step 604; if not, the method moves on to step 602.

The AP then verifies, in step 603, if the maximum value has been reached, i.e. if it has granted access to devices in a maximum number of clusters or not. If this is not the case (i.e. the maximum is not reached), then the AP grants access in step 604. However, if the maximum is reached, the method continues in step 605.

In step 605, the AP checks if a count is in progress (i.e. the predefined time after new_auth setting has not expired; in other words, it is still waiting for responses). If it is not the case, then the AP decides a re-count is necessary. The AP then re-counts the clusters, step 606, and then decides if there are too many clusters, step 607. If this is not the case, the AP grants access in step 604. However, if a count is in progress (step 605) or if there are too many clusters (step 607), the method continues in step 608.

In step 608, the AP verifies if the requesting PP has a priority that is higher than the priority values of all the PPs in another cluster. If this is not the case, then the AP denies access in step 609. However, if the PP has a higher priority, then the AP grants access to the requesting PP and will deny access to the PPs in the cluster with the lowest priority values at next request; step 610.

It will be understood that the present invention has been described purely by way of example, and modifications of detail can be made without departing from the scope of the invention.

Each feature disclosed in the description and (where appropriate) the claims and drawings may be provided independently or in any appropriate combination. Connections may, where applicable, be implemented as wireless connections or wired, not necessarily direct or dedicated, connections. Furthermore, an Acquisition Point may be integrated with a Presentation Point.

It will be understood by a person skilled in the art that the term "content", as applicable, may refer to all the content provided by a content provider or a certain part of this entire content, such as for example a program.

Reference numerals appearing in the claims are by way of illustration only and shall have no limiting effect on the scope of the claims.

The invention clamed is:

1. A method for controlling distribution of content in a domain that comprises a first device adapted to distribute content and grant access to the content for at least one second device, each second device belonging to a cluster in the domain, the method comprising the steps, at the first device, of:
    distributing the content in the domain;
    receiving from a second device a request to access the content that is being distributed;
    if the first device has not granted access to the content to a third device belonging to the same cluster as the second device:
        verifying the number of clusters comprising devices to which the first device has granted access to the content; and
        granting access to the content to the second device only if the number of clusters is lower than a predetermined maximum number of clusters comprising devices to which the content may be distributed.

2. The method of claim 1, wherein the maximum number is variable.

3. The method of claim 2, wherein the maximum number varies dependent on the content.

4. The method of claim 2, wherein the maximum number is time-dependent.

5. The method of claim 1, wherein each second device has a priority value and, when the maximum value number has been reached, access is granted to a requesting second device in a cluster in which access is denied if the priority value of the requesting second device is higher than the priority values of all the second devices in a cluster in which access is granted.

6. The method of claim 5, wherein access will be denied to the second devices in the cluster with the lowest priority values at their next request to access content.

7. The method of claim 1, wherein each cluster has a cluster ID known to all the second devices therein, and the first device stores the cluster IDs and verifies the number of clusters to which it has granted content by counting the number of stored cluster IDs.

8. The method of claim 1, wherein, if the maximum number of clusters has been reached, the first device initiates a challenge/response protocol with all second devices that have been granted access, counts the number of different cluster IDs it receives in response and grants access to the requesting second devices if the maximum number of clusters is not exceeded, if it is not already waiting for such responses from the second devices.

9. The method of claim 1, wherein the first device always grants access to a second device in its own cluster, and wherein this cluster is not counted against the maximum value of clusters.

10. The method of claim 1, further comprising the step at the first device of granting access to the content to the requesting second device, if the first device has granted access to content to a further second device belonging to the same cluster as the requesting second device.

11. A device for controlling distribution of content in a domain that further comprises at least one second device, the device being adapted to distribute content and grant access to the content for at least one of the second devices, each second device belonging to a cluster, the device comprising:
    means for distributing the content;
    means for receiving from a second device a request to access the content that is being distributed;
    if the device has not granted access to the content to a third device belonging to the same cluster as the second device:
        means for verifying the number of clusters comprising devices to which the device has granted access to the content; and
        means for granting access to the content to the second device only if the number of clusters is lower than a predetermined maximum number of clusters comprising devices to which the content may be distributed.

12. The device of claim 11, wherein the maximum number is variable.

13. The device of claim 12, wherein the maximum number varies dependent on the content.

14. The device of claim 12, wherein the maximum number is time-dependent

15. The device of claim 11, further comprising, when the maximum number has been reached, means for granting access to a requesting second device in a cluster in which access is denied if a priority value of the requesting second device is higher than the priority values of all the second devices in a cluster in which access is granted.

16. The device of claim 15, further comprising means for denying access to the second devices in the cluster with the lowest priority values at their next request to access content.

17. The device of claim 11, further comprising means for storing cluster IDs of clusters to which it has granted content, the cluster ID being known to each second device in a cluster, and means for verifying the number of such clusters by counting the number of stored cluster IDs.

18. The device of claim 11, further comprising, if the maximum number of clusters has been reached, a challenge/response protocol with all second devices that have been granted access, means for counting the number of different cluster IDs it receives in response and means for granting access to the requesting second devices if the maximum value of clusters is not exceeded, if it is not already waiting for such responses from the second devices.

19. The device of claim 11, further comprising means for always granting access to second devices in its own cluster and to not count this cluster against the maximum number of clusters.

20. The device of claim 11, further comprising means for granting access to the content to the requesting second device if the device has granted access to content to a further second device belonging to the same cluster as the requesting second device.

* * * * *